(12) United States Patent
Hove et al.

(10) Patent No.: US 6,564,369 B1
(45) Date of Patent: *May 13, 2003

(54) CONFLICT CHECKING USING CONFIGURATION IMAGES

(75) Inventors: James B. Hove, St. Paul, MN (US); Kim A. Pearson, St. Paul, MN (US); Arthur Gorr, Minneapolis, MN (US)

(73) Assignee: Pearson Technical Software, Inc., Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,405

(22) Filed: Aug. 20, 1998

(51) Int. Cl.[7] ................................. G06F 9/44
(52) U.S. Cl. ................ 717/121; 717/168; 717/174; 713/1
(58) Field of Search ................... 707/200–203; 713/1, 2, 100; 717/120, 121, 122, 168, 169, 170, 174, 175–178

(56) References Cited

U.S. PATENT DOCUMENTS

| | | | |
|---|---|---|---|
| 5,155,847 A | 10/1992 | Kirouac et al. | 395/600 |
| 5,247,683 A | 9/1993 | Holmes et al. | 395/700 |
| 5,403,639 A * | 4/1995 | Belsan et al. | 707/204 |
| 5,410,703 A | 4/1995 | Nilsson et al. | 395/700 |
| 5,430,878 A * | 7/1995 | Straub et al. | 717/162 |
| 5,586,304 A | 12/1996 | Stupek et al. | 395/712 |
| 5,680,548 A | 10/1997 | Trugman et al. | 395/200.09 |
| 5,732,275 A | 3/1998 | Kullick et al. | 395/712 |
| 5,758,154 A * | 5/1998 | Qureshi | 713/1 |
| 5,809,251 A | 9/1998 | May et al. | 395/200.53 |

(List continued on next page.)

OTHER PUBLICATIONS

McKinstry, "File Replication", System Asdministration, Feb. 1998, pp 33–37.*
Hall et al., "An architecture for post–development configuration management in a Wide–area network", IEEE, 1997, pp 269–278.*
Reiher et al., "Resolving file conflicts in the Ficus file system", Proc. of the Summer USENIX conf., Jun. 1994, pp 183–195.*
Specker, S., "Using Novell Application Launcher 2.0 and snAppShot for Application Delivery", *Novell AppNotes*, 53–72, (Aug., 1997).
"Conflict Catcher 8 released!", File last modified Nov. 25, 1998. http://www.casadyg.com/products/press/default.html-?recordID=1.

(List continued on next page.)

*Primary Examiner*—Tuan Q. Dam
(74) *Attorney, Agent, or Firm*—Schwegman, Lundberg, Woessner & Kluth, P.A.

(57) ABSTRACT

A configuration image file is a single file containing all the information needed to troubleshoot, distribute or delete software from one or multiple computers. Information contained in configuration image files can comprise files, folders, shortcuts, and registry settings. The individual items in a configuration image file are entries. A conflict checking system includes conflict checking functions to check for potential conflicts in one or more configuration image files. A conflict exists when one or more configuration image files includes entries that are inconsistent. One version of the system identifies folder conflicts. A folder conflict exists when the same entry exists in more than one folder location in one or more configuration image files. Another version of the system identifies version conflicts. A version conflict exists when different versions of the same file exist in the same location within two configuration image files. Another version of the system identifies registry conflicts. A registry conflict exists when two registry values have the same name and belong to the same registry key, but have different data.

32 Claims, 9 Drawing Sheets

U.S. PATENT DOCUMENTS

| | | | | |
|---|---|---|---|---|
| 5,819,295 | A | * 10/1998 | Nakagawa et al. | 707/203 |
| 5,835,911 | A | * 11/1998 | Nakagawa et al. | 707/203 |
| 5,842,024 | A | * 11/1998 | Choye et al. | 717/178 |
| 5,859,969 | A | 1/1999 | Oki et al. | 395/200.3 |
| 5,860,012 | A | 1/1999 | Luu | 395/712 |
| 5,867,714 | A | * 2/1999 | Todd et al. | 395/712 |
| 5,956,513 | A | * 9/1999 | McLain, Jr. | 395/705 |
| 5,964,872 | A | * 10/1999 | Turpin | 713/1 |
| 5,966,540 | A | 10/1999 | Lister et al. | 395/712 |
| 5,983,241 | A | * 11/1999 | Hoshino | 707/203 |
| 5,995,977 | A | * 11/1999 | Presler-Marshall | 707/104.1 |
| 6,021,413 | A | * 2/2000 | Vaduvur et al. | 707/201 |
| 6,117,187 | A | 9/2000 | Staelin | 717/11 |
| 6,298,443 | B1 | * 10/2001 | Colligan et al. | 713/2 |
| 6,202,206 | B1 | 3/2002 | Dean et al. | 717/11 |

OTHER PUBLICATIONS

"LAN Escort Software Product Version 3.5", *Windows Software Distribution Evaluator's Guide; 3rd Ed.*, Pearson Technical Software dba LANovation, (Mar. 1996).

"LAN Escort Software Product Version 4.0", *Windows Software Distribution Administrator's Guide; 6th Ed.*, Pearson Technical Software dba LANovation, (Feb. 1997).

"Seagate Software Network and Storage Management Group, Technical Information Bulletin, TechNote No.: 41001", *Seagate Software*, File last modified Jul. 7, 1997. http://seer.seagatesoftware.com / tnotes / installwin / 41001.htm.

"Seagate Software Network and Storage Management Group, Technical Information Bulletin, TechNote No.: 41027", *Seagate Software*, File last modified Nov. 3, 1997, http://seer.seagatesoftware.com / tnotes / installwin / 41027.htm.

"Seagate Software Network and Storage Management Group, Technical Information Bulletin, TechNote No.: 41066", *Seagate Software*, File last modified Oct. 30, 1997. http://seer.seagatesoftware.com / tnotes / installwin / 41066.htm.

"Seagate Software Network and Storage Management Group, Technical Information Bulletin, TechNote No.: 41070", *Seagate Software*, File last modified Oct. 30, 1997. http://seer.seagatesoftware.com / tnotes / installwin / 41070.htm.

"Seagate Software Network and Storage Management Group, Technical Information Bulletin, TechNote No.: 41086", *Seagate Software*, File last modified Nov. 3, 1997. http://seer.seagatesoftware.com / tnotes / installwin / 41086.htm.

"Seagate Software Network and Storage Management Group, Technical Information Bulletin, TechNote No.: 41116", *Seagate Software*, File last modified Jan. 16, 1998. http://seer.seagatesoftware.com/tnotes/installwin/41116.htm.

Crabb, D., "Conflict Catcher 4", *The Chicago Sun–Times On–Line*, Visited Feb. 26, 1999. http://suntimes.com/crab/product/cc.html.

van Hoff, A., et al., "Open Software Description Format (OSD)", *submitted to the World Wide Web Consortium (W3C)*, http://www.w3.org/TR/NOTE–OSD.html (Aug. 13, 1997).

* cited by examiner

CONFLICT CHECKING USING CONFIGURATION IMAGES

FIELD OF THE INVENTION

The present invention relates generally to computer systems and more specifically to checking for software conflicts using configuration images.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1997, 1998 LANOVATION, All Rights Reserved.

CROSS REFERENCES

This application is related to a co-filed and co-assigned U.S. patent application entitled "Software Distribution, Error Detection and Repair System" Ser. No. 09/136,905.

BACKGROUND OF THE INVENTION

Installing or upgrading software frequently causes unnecessary duplication of files on a target computer. Installing or upgrading software also frequently causes a previously installed version of a file or a previously installed value of a registry key to be overwritten with a different version or a different value.

Duplicate files result in wasted space on a computer's hard disk. In addition, because some files, such as system files, are frequently shared among two or more application programs, duplicate files result in uncertainty for a user of which instance of the file is loaded when the application program is launched. Overwriting a file or registry value causes problems for a user if an application on the target computer requires the particular version of the file or the registry value that was overwritten. Overwriting a file or registry value also causes problems if the application on the target computer is incompatible with the version of the file or registry value installed.

System files, special system setup text files and program files are often duplicated or overwritten when software is installed or upgraded. A system file is a binary file used by a Windows operating system. Example system files include files ending with the extensions .dll, .sys, and .drv. Special system setup text files are files such as a menu file (for example the file that contains the "Start" menu or the "Desktop" menu), an autoexec.bat file, a config.sys file, and files that end in .ini. A program file is a file that executes a computer application. Example program files include files ending with the extensions .exe and .com.

Such problems caused by installing or upgrading software are difficult to predict, difficult to prevent from occurring, and difficult to identify when the problems do occur. Such problems result in lost productivity of a computer user and wasted time on the part of an administrator trying to identify the problems. Methods currently available for finding file conflicts only identify conflicting files after a problem occurs on a computer and no methods currently exist to identify or prevent conflicting registry values.

Therefore, there is a need for a system to identify files and registry values that will be overwritten during a software installation or upgrade before the installation or upgrade is performed. There is also a need for a system to prevent unnecessary duplication of files during a software installation or upgrade.

SUMMARY OF THE INVENTION

The above-identified shortcomings as well as other shortcomings are addressed by the present invention, which will be understood by reading and studying the following specification. The invention is a computerized system which identifies conflicts existing between two or more configuration image files.

A configuration image file is a single file containing all the information needed to troubleshoot, distribute, or delete software on one or multiple computers. Information contained in a configuration image file can be a file of any type or a registry setting. Each file and registry setting in a configuration image file is referred to as an entry. A conflict exists when one or more configuration image files include entries that are inconsistent.

One version of the conflict checking system of the present invention identifies folder conflicts. A folder conflict occurs when the same entry exists in different folders of one or more configuration image files. Installing the configuration image file or files containing the same entry results in duplicate copies of the entry on the target computer. Another version of the conflict checking system identifies version conflicts. A version conflict occurs when different versions of the same entry exist in the same location within two configuration image files. Installing the configuration image files containing different versions of the same entry results in one of the versions of the file being overwritten by the other version of the file. Still another version of the conflict checking system identifies registry conflicts. A registry conflict occurs when two registry values have the same name and belong to the same registry key, but have different data.

The conflict checking system detects conflicts within configuration image files associated with a computer before software is installed. The conflict checking system can also detect conflicts between a configuration image and a current state of a target computer. As a result, file version conflicts, registry value conflicts, and unnecessary duplication of files are avoided. In different embodiments of the invention, computers, computerized systems, application programs, methods and computer-readable media of varying scope are described. Still other and further embodiments, aspects and advantages of the invention will become apparent by reference to the drawings and by reading the following detailed description.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures.

The invention is a conflict checking system which identifies conflicts existing between two or more configuration image files or a configuration image file and the current state of a target computer. The invention is implemented in conjunction with a software distribution, error detection and repair system which is referred to herein as a software maintenance system and further described in an application co-assigned and co-filed herewith entitled "Software Distribution, Error Detection and Repair System," which is herein incorporated by reference.

The detailed description is divided into five sections. In the first section, the hardware and the operating environment in conjunction with which embodiments of the invention can be practiced are described. In the second section, a system level overview of the invention is presented. In the third section, methods of using example embodiments of the invention are provided. In the fourth section, modules and data structures for a particular implementation of the invention are described. Finally, a conclusion to the detailed description is provided.

Hardware and Operating Environment

Figure 1:
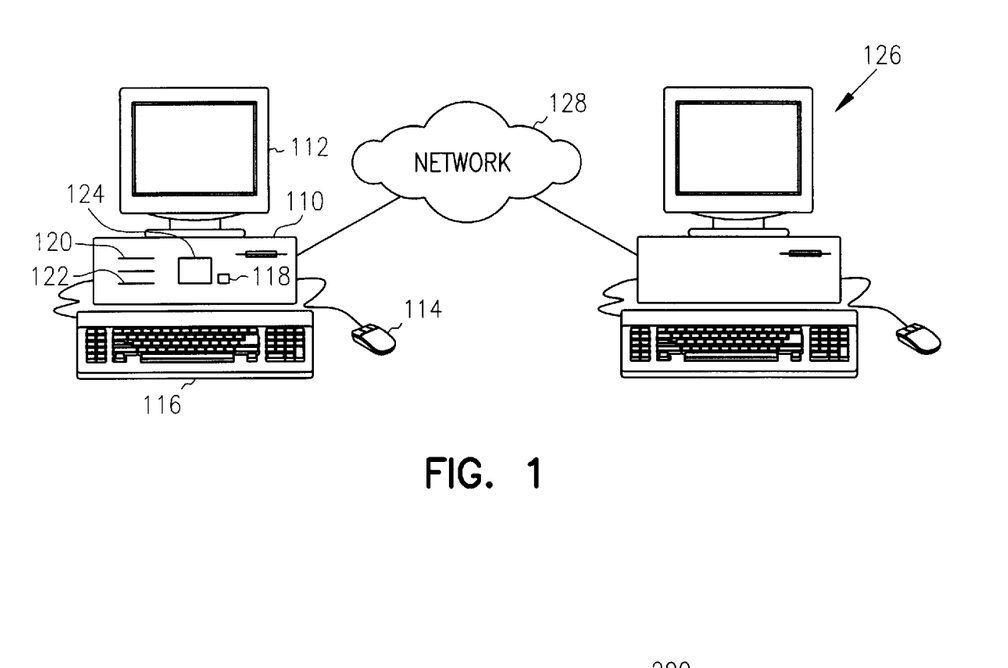
FIG. 1 is a diagram of a typical hardware and operating environment in conjunction with which embodiments of the invention may be implemented.

This section provides an overview of the hardware and the operating environment in conjunction with which embodiments of the invention can be practiced. FIG. 1 is a diagram of a computerized system in conjunction with which embodiments of the invention may be implemented.

Computer 110 is operatively coupled to a monitor 112, a pointing device 114 and a keyboard 116. Computer 110 includes a central processing unit 118, random-access memory (RAM) 120, read-only memory (ROM) 122, and one or more storage devices 124, such as a hard disk drive, a floppy disk drive, a compact disk read-only memory (CD-ROM), an optical disk drive, or a tape cartridge drive. RAM 120 and ROM 122 are collectively referred to as the memory of computer 110. The memory, hard drives, floppy disks, etc., are types of computer-readable media. The computer-readable media provide nonvolatile storage of computer-readable instructions, data structures, program modules and other data for computer 110. The invention is not particularly limited to any type of computer 110.

Monitor 112 permits the display of information for viewing by a user of the computer. Pointing device 114 permits the control of the screen pointer provided by the graphical user interface of window-oriented operating systems such as the Microsoft Windows family of operating systems. Finally, keyboard 116 permits entry of textual information, including commands and data, into computer 110.

The computer 110 operates as a stand-alone computer system or operates in a networked environment using logical connections to one or more remote computers, such as remote computer 126 connected to computer 110 through network 128. The network 128 depicted in FIG. 1 comprises, for example, a local-area network (LAN) or a wide-area network (WAN). Such networking environments are common in offices, enterprise-wide computer networks, intranets, and the Internet.

The hardware and operating environment in conjunction with which embodiments of the invention can be practiced has been described.

System Level Overview

Figure 2:
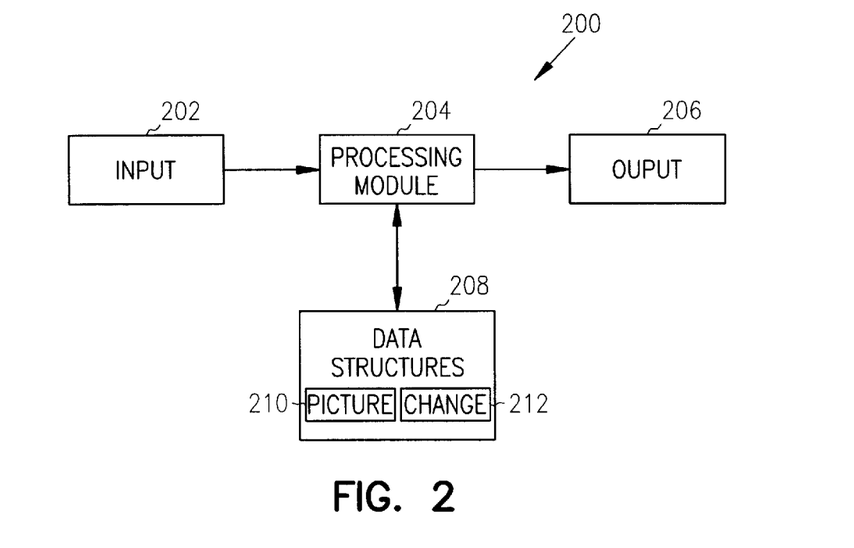
FIG. 2 is a block diagram of one embodiment of a software distribution, error detection and repair system of the present invention.

A system level overview of the operation of an example embodiment of the invention is described by reference to FIG. 2. The software maintenance system 200, as shown in FIG. 2, comprises one or more inputs 202, a processing module 204, one or more outputs 206, and one or more data structures 208.

Inputs. The inputs 202 to the software maintenance system 200 represent requests from a user to check for the existence of a potential conflict within a single configuration image file, between two or more configuration image files, or between a configuration image file and a computer's current environment. Configuration image files are described in detail in the data structures section below. A potential conflict occurs when one or more configuration image files include two or more instances of an entry that are not consistent. A conflict also occurs when a configuration image file and a current state of a target computer include two or more instances of an entry that are not consistent. In one embodiment, three types of conflicts are detected: file version conflicts, folder conflicts and registry value conflicts.

The inputs 202 are received through a graphical user interface, or from a command line, or through a script. Some example ways of using command-line options or scripts include launching a command from a DOS window, from a batch file, in a login script, by using a "Run" option in a "Start" menu, or by creating a short cut on the desktop displayed on the user's monitor such as monitor 112.

These exemplary functions are further described below. The invention is not limited to these functions. Any functions related to software conflict checking are contemplated as inputs and are within the scope of the invention.

Outputs. Output 206 represents a result produced by the processing module 204 in response to the input 202. An example output is a message displayed on the user's monitor 112 showing the number and type of conflicts found. Another example output is a report that includes detailed information on the conflicts found and which is sent to a printer or saved as a text file on computer-readable media, such as a storage device 124. Additional outputs 206 will be apparent from the description below.

Data Structures. Data structures 208 are checked by the processing module 204 for the existence of potential software conflicts. Data structures 208 comprise one or more picture files 210 and one or more change files 212. Picture files 210 and change files 212 are collectively referred to as configuration image files.

A picture file 210 is a copy of certain files and registry settings from a computer compressed into a single file. The picture file 210 contains registry settings and files of any type including initialization (INI) files, registry sections (for example, all of the current user or hardware settings sections), shortcuts or aliases, executable files, special system setup text files (such as autoexec.bat and config.sys), the desktop (all the icons that appear on the desktop), the Windows "Start" menu, files and folders (i.e. directories). The user specifies what software to include in the picture file 210. Alternatively, the user selects from a list of predefined options of software to include in the picture file 210. The selection determines the files and registry settings in the picture file 210. A picture file 210 is stored as a single, compressed linear file that is viewable and editable by the user.

In one embodiment, picture file 210 stores the actual contents of registry sections, INI files, menu items (such as the "Start" menu and the desktop), folders, and files. In an alternate embodiment, picture file 210 stores characteristic information for the folders and files rather than the actual contents of the files and folders. If the picture file 210 only contains characteristic information about the folders and files but not the contents, the characteristic information stored comprises the name, size, data and time stamp, and version number of the file or folder. An example of when a user would elect to store just the characteristic information about the files and folders is when a picture file 210 is intended for use as a baseline for comparison purposes when creating a change file 212. Storing characteristic information, but not the contents of files and folders, decreases the time it takes to create a picture file 210 and requires less disk space. However, in order for a picture file 210 to update files and folders when it is applied to a computer, the contents of the files and folders must be stored.

A change file 212 contains changes, additions and deletions to the software on the computer, including lines or sections from INI files, registry keys, sections of special system setup text files (such as autoexec.bat and config.sys), single desktop icons, single items in the "Start" menu, files, and folders. A change file 212 is stored as a single, compressed linear file that is viewable and editable by the user.

One method of creating a change file 212 is to compare a picture file 210 with the corresponding files and registry settings in the current computer environment. The results of the comparison are saved as a change file. Alternate methods of creating a change file 212 include comparing two picture files 210, two change files 212, or by manually building the change file 212. Change files 212 typically include the contents of folders and files; however, in an alternate embodiment, the change file 212 does not contain the contents of folders and files. For example, when a change file 212 is created by comparing two picture files 210 which contain characteristic information only (as opposed to file contents), the change file 212 will not contain the contents of the files.

Picture file 210 and change file 212 are similar in several ways. For example, picture file 210 and change file 212 both store software, data and settings together in a single file that is viewable and editable by the user. The individual contents of the picture file 210 and the change file 212 are referred to herein as entries. Picture file 210 and change file 212 both are stored in a compressed form. The entries in picture file 210 and change file 212 can be applied to, and "unapplied" from, a target computer.

Picture file 210 and change file 212 are collectively referred to in this description as configuration image files. Even though individual entries in configuration image files are compressed into a larger file, each entry retains its original characteristics such as path, size, creation date, etc.

Picture file 210 and change file 212 differ in the amount of information stored in each. Picture file 210 stores a copy of each software entry. Change file 212 stores only changes, additions and deletions to the software entry. Differences in the amount of information stored in picture file 210 and change file 212 are summarized in Table 1 below.

TABLE 1

Contents of Picture Files and Change Files

| Picture File Contents | Change File Contents |
| --- | --- |
| entire INI files | changed INI file lines or sections |
| registry sections | changed registry keys |
| special system setup text files | sections of special system setup text files |
| all desktop icons | single desktop icons |
| entire Windows "Start" menu | single items in the Windows "Start" menu |
| files | files |
| folders | folders |

Processing Modules. Referring back to FIG. 2, processing module 204 comprises program modules that perform functions requested by the user. Generally, program modules include routines, programs, objects, components, data structures, etc., that perform particular functions or implement particular abstract data types.

Figure 3:
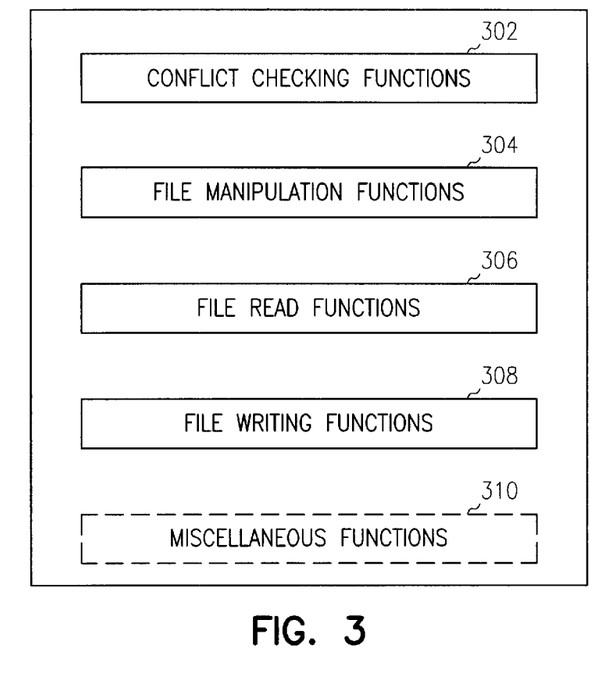
FIG. 3 is a block diagram of the processing modules of an example embodiment of the system of FIG. 2.

In one embodiment, as shown in FIG. 3, processing module 204 comprises program modules for performing conflict checking functions 302, file manipulation functions 304, file reading functions 306, and file writing functions 308.

The conflict checking functions 302 comprise functions to check for potential conflicts in one or more configuration image files or in a configuration image file and the current state of a target computer. The file manipulation functions 304 open and close configuration image files. The file reading functions 306 read the contents of existing configuration image files. The file writing functions 308 change, add or delete information in configuration image files. An alternate embodiment also comprises miscellaneous functions 310 shown in phantom in FIG. 3.

Example Scenarios. In one embodiment, the present invention detects three types of conflicts: version conflicts, folder conflicts and registry value conflicts. Three example scenarios are now described to illustrate these conflicts. The scenarios provide examples for illustrative purposes only.

The first scenario describes a version conflict. A system administrator creates two configuration image files to distribute to several users on a network. The first configuration image file is created to distribute a word processing application. The second configuration image file is created to distribute an Internet browser application. The conflict checking functions 302 detect that a system file named OLE2.DLL exists in the "windows/system" folder in each of the configuration image files. However, the configuration image files contain different versions of the file. Not only are the date and time attributes different, but the size of the files is different. A version conflict exists because there are different versions of the file contained in the same folder in the two configuration image files. Applying the configuration image files to a computer will result in one of the versions of the file being overwritten by the other version of the file.

The second scenario describes a folder conflict. A system administrator creates a configuration image file to distribute an application to a number of users on a network. The administrator checks the new configuration image file against all the configuration image files that have already been checked for conflicts. The conflict checking functions 302 detect that a dynamic link library system file, COMCTL32.DLL, is stored in the folder "\program_files\new_application" in the new configuration image file and in the folder "\windows\system" in one of the existing configuration image files. A folder conflict exists because the same file is located in two folders. If both configuration image files are applied to a target computer, COMCTL32.DLL will exist in two places on the computer. The computer will use the copy of COMCTL32.DLL that is pointed to by the first application that is started. Problems will arise if one of the applications is updated later and only one copy of COMCTL32.DLL is upgraded. Creating configuration image files and then using the conflict checking functions 302 of the present invention to identify duplicate files allows the user to move or remove the duplicate files to prevent future software problems.

The third scenario describes a registry value conflict. A system administrator creates a configuration image file to distribute an application to several users on the network. The conflict checking functions 302 detect that the value of registry key HKEY_LOCAL_MACHINE\SOFTWARE\MICROSOFT\WINDOWS MESSAGING SUB-SYSTEM\CMCDLLNAME is set to "mapi.dll" in the configuration image file, and the value of the corresponding registry key is set to "mapi32.dll" on the target computer. A registry value conflict exists because applying the configuration image file to the target computer will overwrite the existing registry value with another value.

The system level overview of the operation of an example embodiment of the invention has been described in this section of the detailed description. The software maintenance system comprises one or more inputs, a processing module, one or more outputs and one or more data structures. The data structures comprise one or more picture files and one or more change files collectively referred to as configuration image files. The processing module performs conflict checking functions to check for potential conflicts in one or more of the configuration image files.

Methods of the Invention

In the previous section, a system level overview of the operation of an example embodiment of the invention was described. In this section, the particular methods of such an example embodiment are described by reference to a series of flowcharts. The methods to be performed constitute computer programs made up of computer-executable instructions. Describing the methods by reference to a flowchart enables one skilled in the art to develop such programs including such instructions to carry out the methods on suitable computerized systems.

Figure 4:
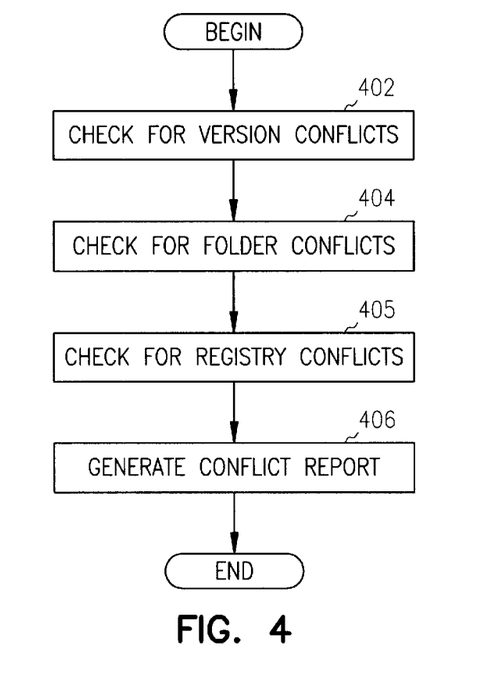
FIG. 4 is a high level flowchart of conflict checking methods to be performed by a computer according to an example embodiment of the invention.

FIG. 4 is a high level flowchart of methods to be performed by a computer according to an example embodiment of the invention. This flowchart indicates the acts performed by the software maintenance system in order to check entries in one or more configuration image files for version conflicts, folder conflicts and registry value conflicts. An entry refers to an individual item in a configuration image file. Example entries include registry settings, folders, shortcuts and files. In the embodiment described in FIG. 4, file entries are checked for potential conflicts.

A conflict occurs when one or more configuration image files include two or more instances of an entry that are not consistent. A conflict also occurs when a configuration image file and a current state of a target computer include two or more instances of an entry that are not consistent. In one embodiment, system files and program files are checked when finding and categorizing conflicts. Example of system files are drivers (e.g., .DRV, .VBX extensions) and DLLs. Examples of program files are "win.com" and "explorer.exe". However, the invention is not limited to checking system files and program files. Alternate embodiments that check any type of file or registry setting conflict are contemplated and within the scope of the invention.

In the example embodiment shown in FIG. 4, the software maintenance system checks program files and system files for version conflicts (block 402), folder conflicts (block 404) and registry value conflicts (405). The present invention is not limited to the order shown in FIG. 4. In alternate embodiments, checking for folder conflicts (block 404), checking for file version conflicts (block 402) and checking for registry value conflicts (405) are performed in any order or are performed simultaneously. The software maintenance system generates a conflict report (block 406) comprising the results of the check for version conflicts, the check for folder conflicts and the check for registry value conflicts.

Table 2 below summarizes three example conflicts which are described in more detail by reference to FIGS. 5, 6 and 7.

TABLE 2

Example conflicts detected by the Conflict Checking System.

| | Folder Conflict | Version Conflict | Registry Value Conflict |
|---|---|---|---|
| Entry Type | Same System File | Different versions of the same System File or Program File | Same Registry Key with matching value names but different data |
| Location | In different folders of one or more configuration image files | In the same folder in two configuration image files | In same folder in two configuration image files |
| Problem | duplicate copies of file installed | overwriting of the file | overwriting of the file |

Version Conflicts. FIG. 5 is a more detailed flowchart of "check for version conflicts" as shown in block 402 in FIG. 4. In one embodiment, a version conflict occurs when the following three conditions are met. One condition is that two or more configuration image files contain the same system file or program file entry. Another condition is that the system file or program file entry exists in the same folder within each one of the configuration image files. A further condition is that each one of the configuration image files contains a different version of the system file or program file entry.

To determine whether two or more file entries have different versions, the software maintenance system compares the following characteristic information stored in the configuration image files: file size, file version information (if available), and the file's last modified time and date. In one embodiment, the software maintenance system also compares the file contents at the byte level to determine whether a version conflict exists. In such case, a 32-bit cyclical redundancy check (CRC) algorithm is used to compare the file contents.

Figure 5:
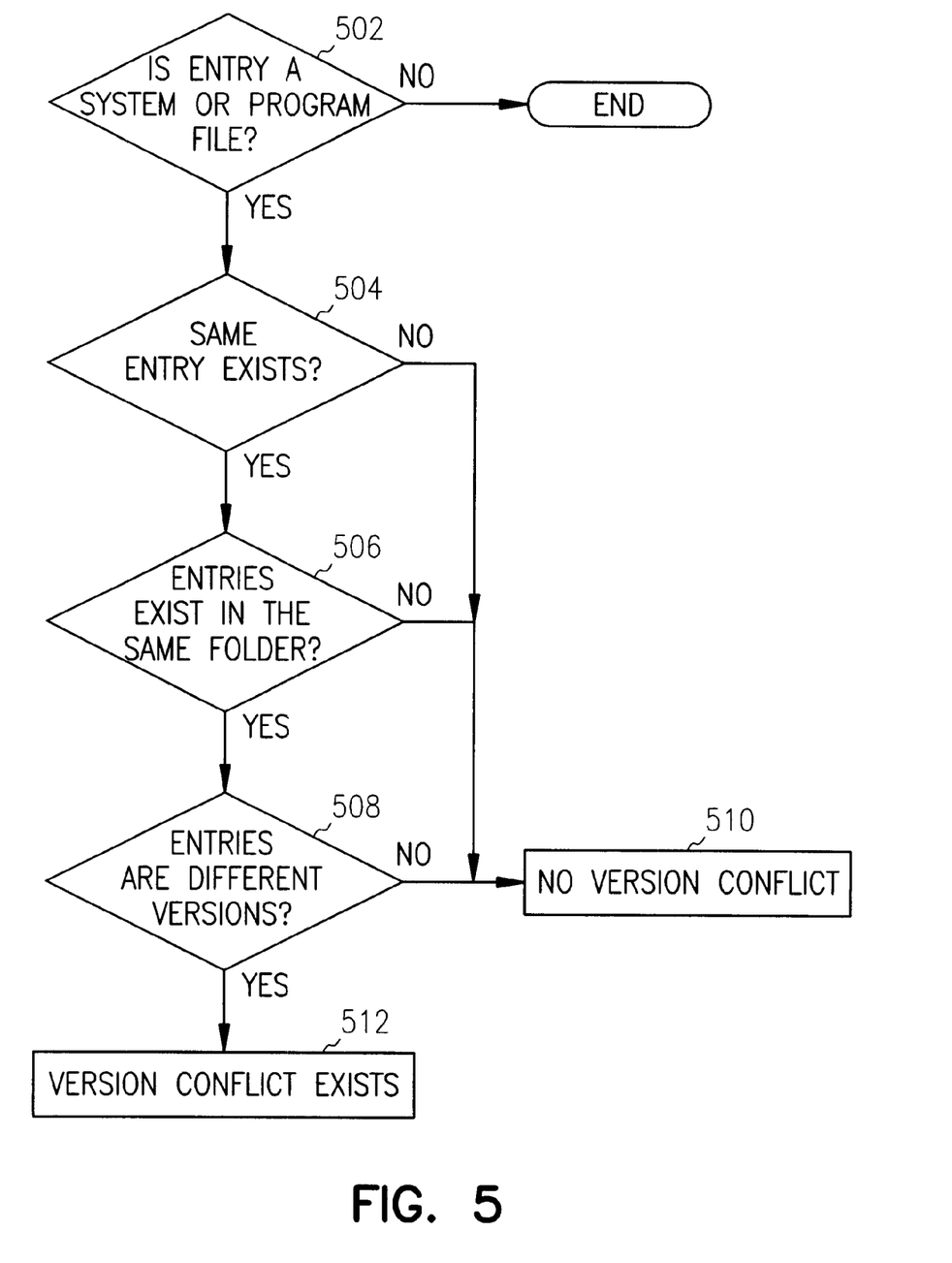
FIG. 5 is a flowchart of the method for detecting file version conflicts shown in FIG. 4.

The example embodiment shown in the flowchart of FIG. 5, checks the configuration image file for system files and program files (block 502). Only system file entries and program files entries are checked for version conflicts in the example embodiment. The configuration image files are checked for the existence of the same system file entry or program file entry (block 504). If the entries do not exist in more than one configuration image file, then no version conflict exists (block 510). Entries that exist in more than one configuration image file are checked to see if the entries exist within the same folder within the configuration image files (block 506). If the entries do not exist in the same folder, then no version conflict exists (block 510). Entries that exist in the same folder of more than one configuration image file are checked for different versions (block 508). If the versions are the same, then no version conflict exists (block 510). If the versions are different, then a potential version conflict exists (block 512).

Folder Conflicts. FIG. 6 is a more detailed flowchart of "check for folder conflicts" as shown in block 404 in FIG. 4. In one embodiment, a folder conflict exists when the same system file entry occurs in more than one folder location in one or more configuration image files. Program files are not evaluated for folder conflicts because the existence of multiple locations for an executable file is not considered a conflict in this embodiment.

Figure 6:
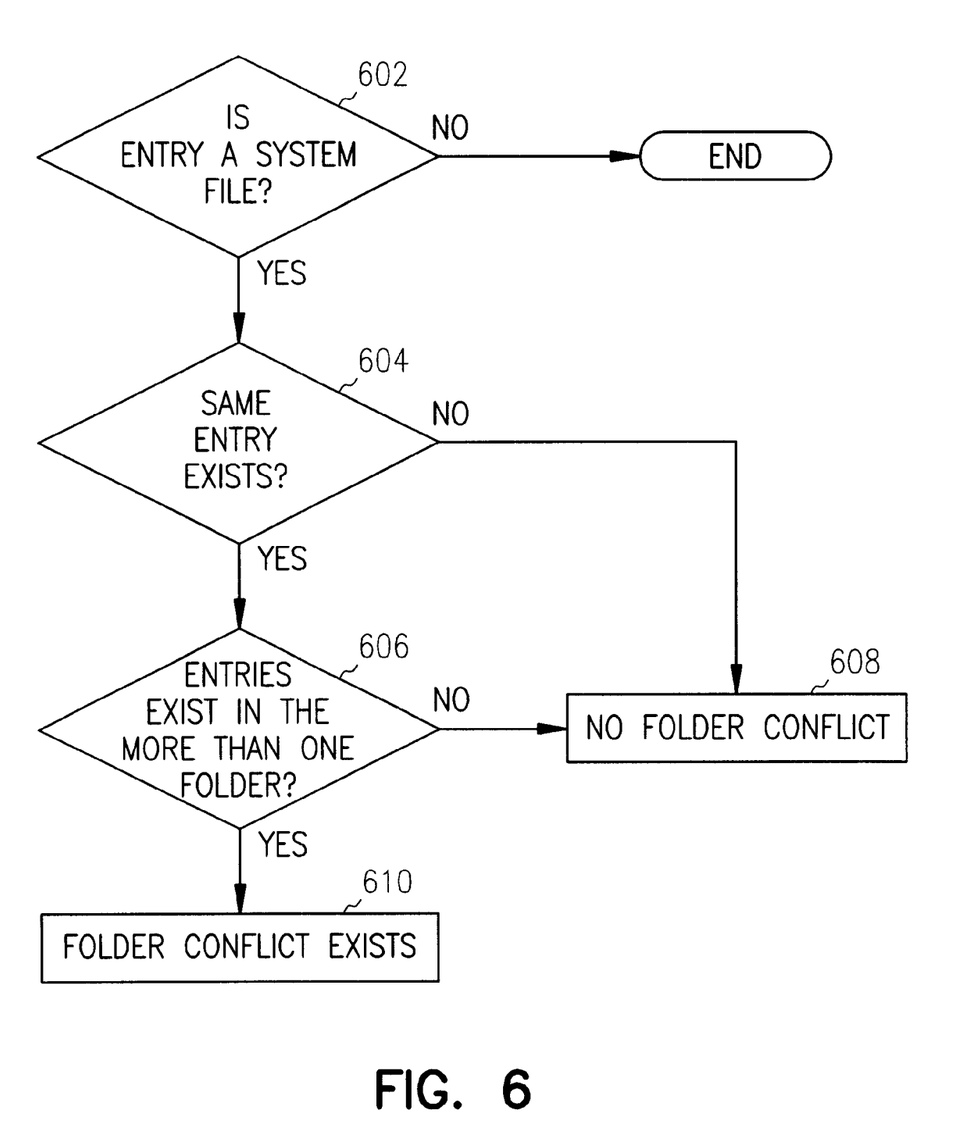
FIG. 6 is a flowchart of the method for detecting folder conflicts shown in FIG. 4.

The example embodiment shown in the flowchart of FIG. 6, checks the configuration image file for system files (block 602). Only system file entries are checked for folder conflicts in the example embodiment. The configuration image files are checked for the existence of the same system file entry (block 604). If the entries do not exist in more than one configuration image file, then no folder conflict exists (block 608). Entries that exist in more than one configuration image file are checked to see if the entries occur in more than one folder within the configuration image files (block 606). If the entries do not occur in more than one folder, then no folder conflict exists (block 608). If the entries exist in different folders of one or more configuration image file then a folder conflict exists (block 610). If the entries exist in the same folders, then no folder conflict exists (block 608) but the entries should be checked for version conflicts as described above with respect to FIG. 4.

Registry Value Conflicts. FIG. 7 is a more detailed flowchart of "check for registry value conflicts" as shown in block 405 in FIG. 4. In one embodiment, a registry value conflict occurs when the following conditions are met. One condition is that two or more configuration image files contain the same registry key. Another condition is that the registry keys have the same registry value. A further condition is that the registry values have different data.

Figure 7:
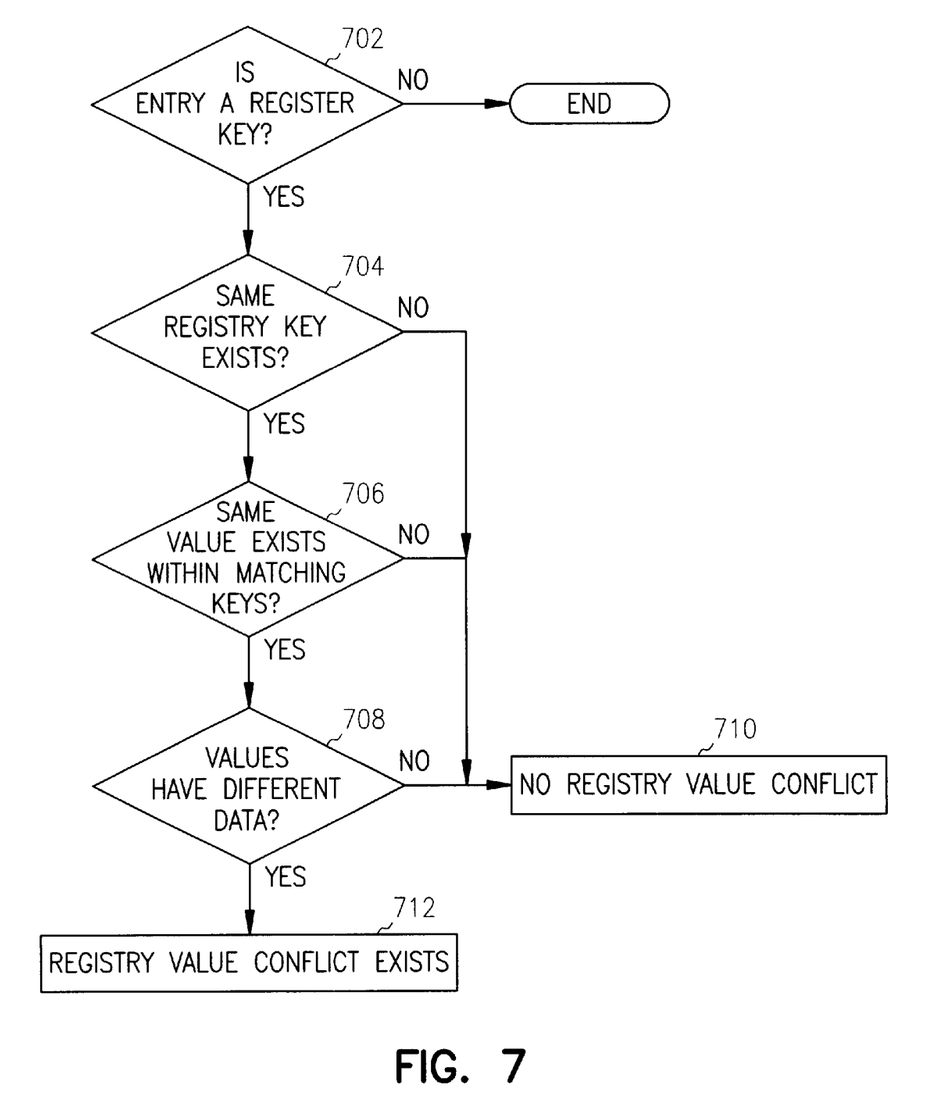
FIG. 7 is a flowchart of the method for detecting registry value conflicts shown in FIG. 4.

The example embodiment shown in the flowchart of FIG. 7 checks a configuration image file for registry keys (block 702). Only registry keys are checked for registry value conflicts in the example embodiment. Other configuration image files are checked for the existence of the same registry key (block 704). If the entries do not exist in more than one configuration image file, then no registry value conflict exits (block 710). Entries that exist in more than one configuration image files are checked for the same registry value (block 706). If the value does not exist in more than one configuration image file, then no conflict exists (block 710). Finally the data within the matching registry values is checked (block 708). If the data is the same, then no conflict exists (block 710). If the data is different, then a possible conflict exists (block 712).

Generate Report. If one or more conflicts are found, a conflict report as shown in block 406 of FIG. 4 is generated containing the number of conflicts and the details of the conflicts. The details of the conflicts comprise the names of the configuration image files that contain conflicts, the folder location (i.e. directory path) within the configuration image file for the entry, the file size for the entry, the last modification date and time for the entry, the version information for the entry.

LANOVATION Picture Taker Implementation

The following discussion of FIGS. 8–13 describes the programming modules described earlier and their functionality in further detail. Describing the functionality of the programming modules in FIGS. 8–13 enables one skilled in the art to develop programs including such functionality to be carried out on suitable computer systems.

Figure 8:
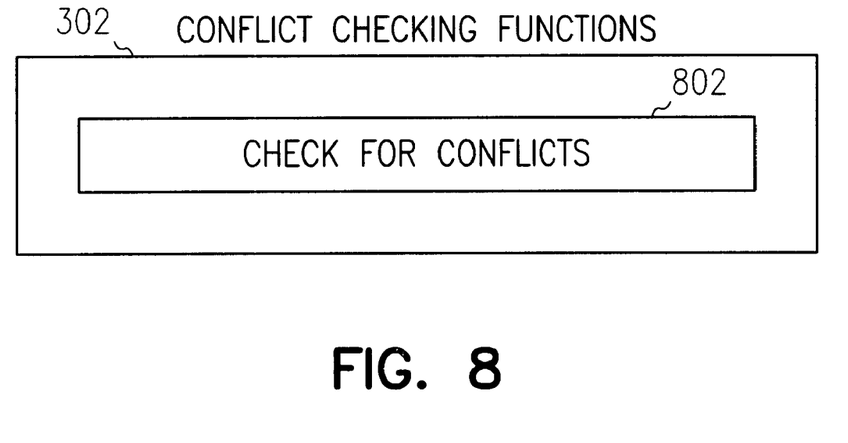
FIG. 8 is a block diagram of the conflict checking file functions of FIG. 3.

FIG. 8 is a block diagram of the conflict checking functions 302 of FIG. 3. A Check for Conflicts function 802 allows a user to select the configuration image files that should be checked for conflicts. The user can either select two or more configuration image files to check against each other or the user can select one configuration image file to check against one or more other configuration image files. The Check for Conflicts function 802 also checks the configuration image files for conflicts and generates a report listing the types and locations of conflicts.

Figure 9:
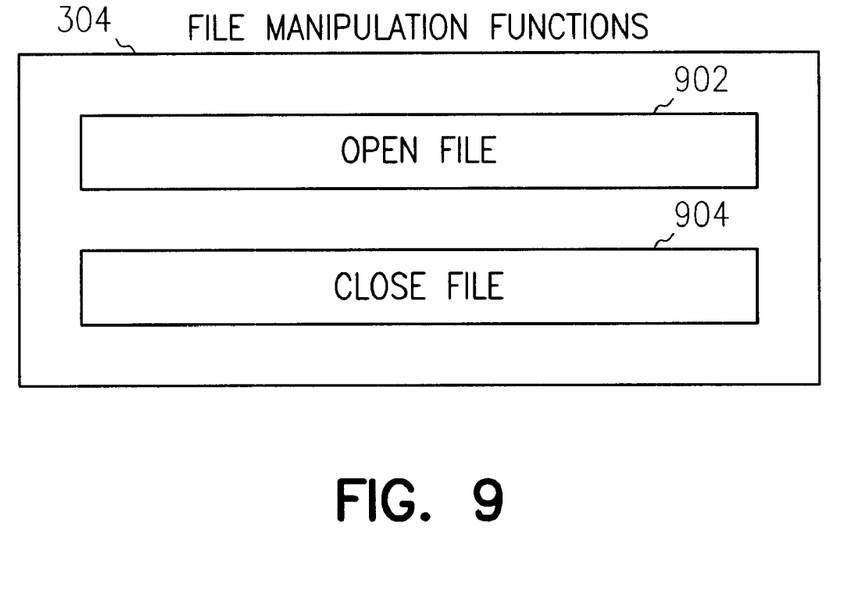
FIG. 9 is a block diagram of the file manipulation functions of FIG. 3.

FIG. 9 is a more detailed block diagram of the file manipulation functions 304 of FIG. 3. In one embodiment the file manipulation functions 304 comprise an Open File function 902 and a Close File function 904. The Open File function 902 creates a new configuration image file or opens an existing configuration image file for reading or writing. The functions use a configuration image file identifier (handle) variable to identify the appropriate file. A valid handle is obtained by calling the Open File function 902. The resulting handle can then be used, for example, in calls to file writing functions as described below. A call to Open File 902 is eventually followed by a call to Close File 904 which closes the configuration image file.

Figure 10:
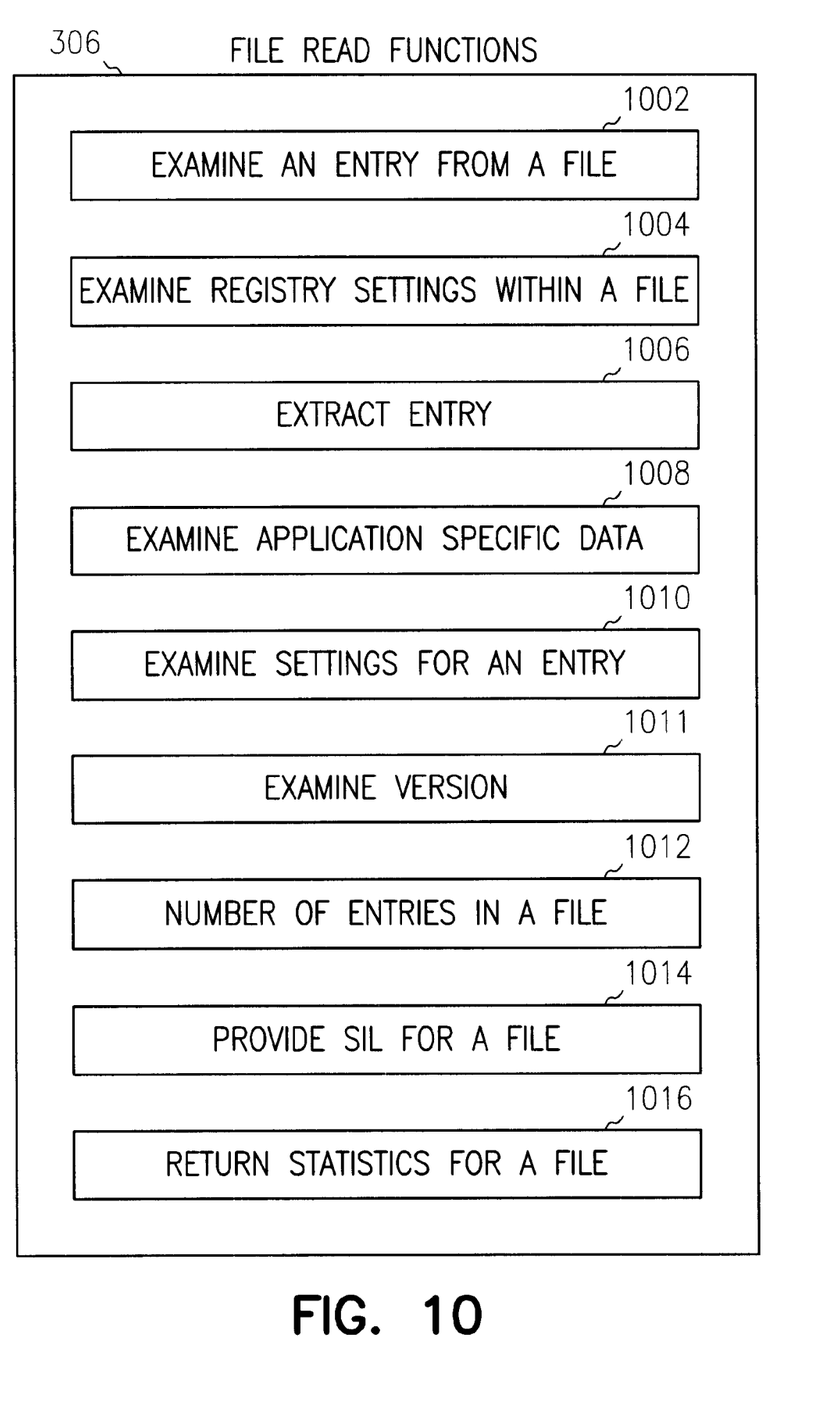
FIG. 10 is a block diagram of the file reading functions of FIG. 3.

FIG. 10 is a more detailed block diagram of the file reading functions 306 of FIG. 3. In one embodiment, a plurality of functions exist for reading the contents of existing configuration image files. Each one of the file reading functions 306 requires that a configuration image file handle variable be initialized using the Open File function 802. An Examine Entry function 1002 traverses the files and shortcuts within a configuration image file and reads the names of one or more entries. An Examine Registry Settings function 1004 reads the registry settings stored within a configuration image file. An Extract Entry function 1006 copies the contents of a configuration image file entry into a memory buffer or a file for examination or modification. An Examine Application Data function 1008 reads any application-specific data stored in the configuration image file. An Examine Settings function 1010 retrieves the settings for an individual entry in a configuration image file, for instance the file attributes, time and date, and so on. An Examine Version function 1011 reads the version information for an executable-file entry. A Number of Entries function 1012 returns the total number of entries in a configuration image file. A Provide Storage Information List function 1014 reads a storage information list (SIL) for the configuration image file. The storage information list keeps track of what portions of a computer, and its configuration, the configuration image file pertains to. A Return Statistics function 1016 returns statistics for the configuration image file, such as the total number of entries in the file, the total size of the information in the file in an uncompressed state, and the total size of the information in a compressed state.

Figure 11:
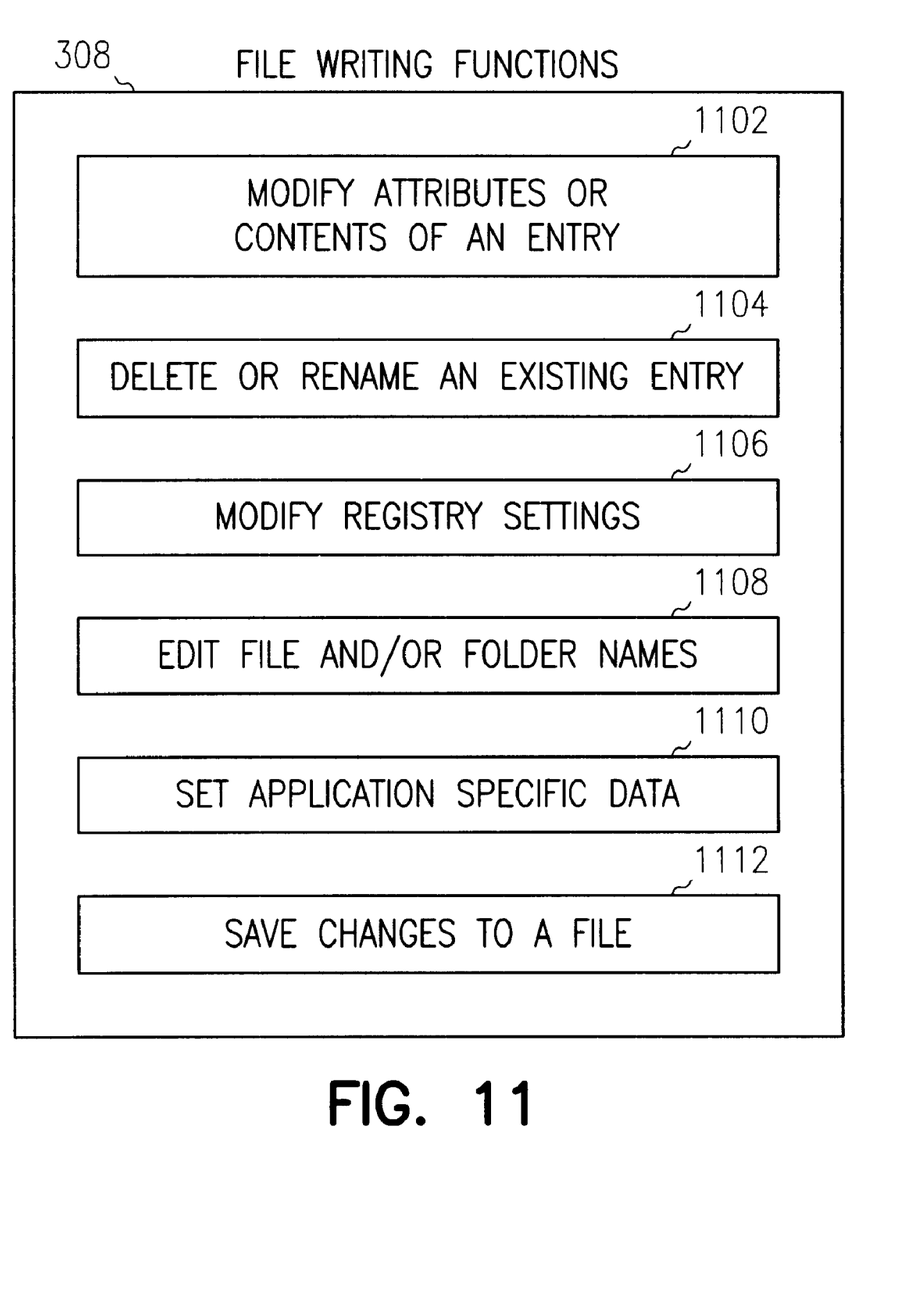
FIG. 11 is a block diagram of the file writing functions of FIG. 3.

FIG. 11 is a more detailed block diagram of the file writing functions 308 of FIG. 3. In one embodiment, a plurality of functions exist for changing, adding and deleting information in configuration image files. Each one of the file writing functions 308 requires that a configuration image file handle variable initialized using the Open File function 902. A Modify Attributes/Contents function 1102 changes the attributes or contents of a configuration image file entry. In one embodiment there are no separate functions for adding a new entry to a configuration image file as opposed to changing an existing one. The Modify Attributes/Contents function 1102 works for both new entries (which are added to the file) and existing entries (whose previous information is replaced). A Delete/Rename function 1104 removes an existing entry or entries from a configuration image file or renames an existing entry. A Modify Registry Settings function 1106 adds, changes or removes registry settings. A Edit File/Folder Names function 1108 changes the name of file and folder names in a configuration image file. The name changed may be that of a file or folder within the configuration image file, a component of a shortcut or registry key or part of a line of text within a file. A Set Application Specific Data Function 1110 stores application specific data in a configuration image file. A Save Changes function 1112 saves changes to an open configuration image file.

Figure 12:
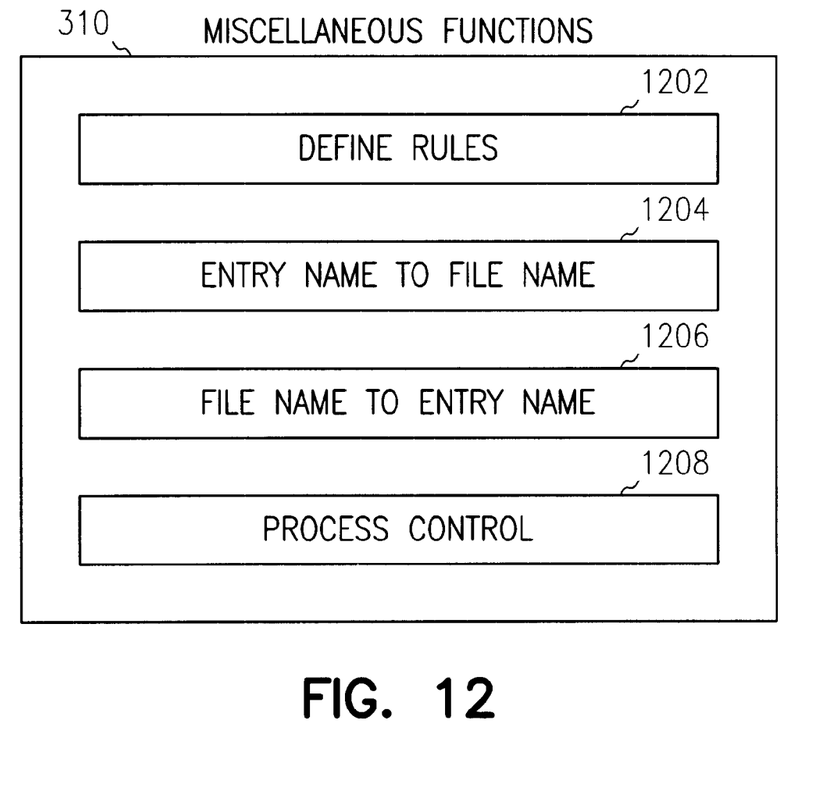
FIG. 12 is a block diagram of miscellaneous functions of FIG. 3.

FIG. 12 is a more detailed block diagram of the miscellaneous functions. Miscellaneous functions include functions for manipulating the environment used by the high-level functions, and translating the character strings used by the other functions. A Define Rules function 1202 defines a text-based rules file used when deciding how to manipulate and compare various files and registry components. An Entry Name to File Name function 1204 translates an entry name used in functions like the Examine Entry function 1002 (shown in FIG. 10) into the corresponding file-name on the current computer. A File Name to Entry Name function 1206 translates a file name into an entry name that can be used in functions like the Modify Attributes/Contents function 1102 (as shown in FIG. 11). A Process Control function 1208 controls the operation of functions that can take a long time to execute. For example, the Process Control function 1208 can provide the user with a "Cancel" button or status window during operation.

Figure 13:
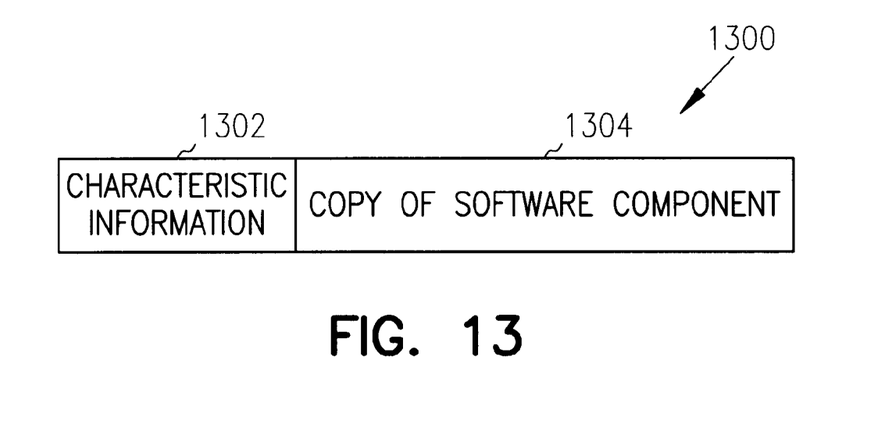
FIG. 13 is an illustration of one embodiment of a configuration image file.

FIG. 13 is an illustration of one embodiment of a configuration image file 1300. The configuration image file 1300 comprises a first entry 1302 containing characteristic information for a component of a computer system's software and a second entry 1304 containing a copy of the actual software component such as a copy of a file, a folder, a shortcut or a registry entry. The characteristic information for the software component comprises type, name, date, time, attributes, size, and version number.

In an example embodiment, picture files and change files are referred to as Portable Windows files. Picture files have the extension .pwf. Change files are also referred to as Portable Windows Change files. Change files have the extension .pwc.

CONCLUSION

A configuration image file is a single file that contains other files, settings, registry keys and values, and shortcut files. Information contained in configuration image files can comprise files, folders, shortcuts, and registry settings. An individual item in a configuration image file is referred to as an entry. Conflict checking functions comprise functions to check for potential conflicts in one or more configuration image files. A conflict exists when one or more configuration image files include entries that are inconsistent.

One version of the conflict checking system of the present invention identifies folder conflicts. A folder conflict exists when the same entry exists in more than one folder location in one or more configuration image files. Another version of the conflict checking system identifies version conflicts. A version conflict exists when different versions of the same file exist in the same location within two configuration image files. Another version of the conflicting checking system identifies registry conflicts. A registry conflict exists when two registry values have the same name and belong to the same registry key, but have different data. The conflict checking system detects conflicts within configuration image files before software is installed. As a result file version conflicts and unnecessary duplication of files are avoided.

In other embodiments, other conflicts among entries in configuration image files may be similarly identified without departing from the invention. For example conflicts in initialization (INI) file settings can be detected. In addition, using the file writing functions of the present invention, configuration image files having conflicts can be modified. Further, the present invention can return error codes when the conflict checking system detects an error so that errors may be checked from within a batch file or other computer program. The conflict checking system could also be instructed to flag a specific file as a conflict wherever the file is found in a configuration image file. The last item is useful if, for example, a user knows that a specific DLL contains a bug that makes it unusable after Dec. 31, 1999.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of checking for conflicts using configuration image files with multiple entries, the method comprising:

examining one or more configuration image files having multiple entries, wherein at least some of the multiple entries are files;

identifying in one or more configuration image files at least two instances of one of the entries; and checking for an inconsistency between the instances wherein the inconsistency indicates a potential conflict.

2. The method of claim 1, wherein the entry is a system file.

3. The method of claim 2, wherein the inconsistency indicates a potential conflict when the instances of the entry are located in different folders in a configuration image file.

4. The method of claim 2, wherein the inconsistency indicates a potential conflict when the instances of the entry are located in different folders and wherein the different folders are located in different configuration image files.

5. The method of claim 1, wherein at least one of the entries is selected from the group consisting of: system files and program files.

6. The method of claim 5, wherein the inconsistency indicates a potential conflict when the instances are located in a folder in different configuration image files and the instances are different versions of the entry.

7. The method of claim 1, wherein the entries are registry keys.

8. The method of claim 5, wherein the inconsistency indicates a potential conflict when the instances are located in at least one configuration image file and the instances are registry values with the same name and different data.

9. The method of claim 1, wherein the entries are initialization files.

10. The method of claim 1, wherein the act of identifying instances is performed by comparing entries within a configuration image file.

11. The method of claim 1, wherein the act of identifying instances is performed by comparing entries in two or more configuration image files.

12. The method of claim 1, wherein the act of identifying instances is performed by comparing entries in a configuration image file to a computer's software.

13. The method of claim 1, wherein the act of identifying instances is performed by comparing entries in a first group of configuration image files to entries in a second group of configuration image files.

14. A computer readable medium having computer-executable instructions for performing the steps recited in claim 1.

15. A method of checking for a conflict in one or more configuration image files having multiple entries, the method comprising:
    examining one or more configuration image files having multiple entries, wherein at least some of the multiple entries are files;
    identifying in the one or more configuration image files at least two entries having a matching entry name;
    comparing storage location information stored in the configuration image file for each one of the entries with the matching entry name;
    comparing characteristic information stored in the configuration image file for each one of the entries with the matching entry name; and
    identifying a potential conflict based on results of comparing storage location information and characteristic information of the two entries.

16. A computer readable medium having computer-executable instructions for performing the steps recited in claim 15.

17. The method of claim 15, further comprising generating a conflict report presenting the potential conflict identified.

18. The method of claim 15, further comprising presenting a message on a computer screen presenting the potential conflict identified.

19. A method of checking for a folder conflict in one or more configuration image files having multiple entries, the method comprising:
    examining one of more configuration image files having multiple entries, wherein at least some of the entries comprise files;
    determining if two or more instances occur in the one or more configuration image files for one of the entries; and
    determining if the instances exist in different folders in the configuration image files when two or more instances occur.

20. A computer readable medium having computer-executable instructions for performing the steps recited in claim 19.

21. A method of checking for a version conflict in one or more configuration image files having multiple entries, the method comprising:
    examining two or more configuration image files having multiple entries, wherein at least some of the multiple entries are files;
    determining if two or more instances occur in the two or more configuration image files for one of the entries; and
    determining if the instances exist in folders with an identical name in different configuration image files when two or more instances occur, and
    determining if each one of the instances is a different version, when the instances exist in folders with an identical name in different configuration image files.

22. The method of checking for version conflicts of claim 21, wherein the different version of the instances is identified by comparing at least one of the characteristics selected from the group consisting of: entry size, entry version information, entry modification date, and entry modification time.

23. A method of checking for a registry value conflict in multiple configuration image files having multiple entries, the method comprising:
    examining two or more configuration image files having multiple entries, wherein at least some of the multiple entries are files;
    determining if two or more instances occur in different configuration image files for a registry key entry; and
    determining if the instances have a value with an identical name and different data when two or more instances occur.

24. A computer readable medium having computer-executable instructions for performing the steps recited in claim 23.

25. A computerized system for detecting conflicts in configuration image files, the system comprising:
    a plurality of configuration image files, each one of the configuration image files comprising one or more entries, wherein an entry comprises characteristic information for a software component and a copy of the contents of the component of the software computer; and
    a programming module for detecting conflicts within the plurality of configuration image files.

26. The computerized system of claim 25, wherein the program module detects folder conflicts.

27. The computerized system of claim 25, wherein the program module detects version conflicts.

28. The computerized system of claim 25, wherein the program module detects registry value conflicts.

29. A method of checking for a conflict in one or more configuration image files having multiple entries, the method comprising:
- determining if a folder conflict exists, comprising:
  - examining one or more configuration image files having multiple entries, wherein at least some of the multiple entries are files;
  - determining if two or more copies occur for a system file in the configuration image files; and
  - determining if the copies exist in at least two different folders in the configuration image files when two copies occur;
- determining if a version conflict exists, comprising:
  - examining two or more configuration image files having multiple entries, wherein at least some of the multiple entries are files;
  - determining if two or more instances occur for one of the entries in the configuration image files;
  - when two or more instances occur, then determining if the instances exist in folders with an identical name in two different configuration image files; and
  - when the instances exist in folders with an identical name in different configuration image files, determining if each one of the instances is a different version; and
- determining if a registry value conflict exists, comprising:
  - examining two or more configuration image files having multiple entries, wherein at least some of the multiple entries are files;
  - determining if two or more copies occur for a registry key entry in the configuration image files; and
  - determining if the copies have a value with an identical name and different data when two or more copies occur.

30. The method of checking for a conflict as claimed in claim 29, wherein the entries for which a version conflict is identified are copies of program files.

31. The method of checking for a conflict as claimed in claim 29, wherein the entries for which a version conflict is identified are copies of system files.

32. A computer readable medium having computer-executable instructions for performing the steps recited in claim 29.

* * * * *